(12) United States Patent
Kunze

(10) Patent No.: US 8,903,193 B2
(45) Date of Patent: Dec. 2, 2014

(54) REDUCING MEMORY BANDWIDTH CONSUMPTION WHEN EXECUTING A PROGRAM THAT USES INTEGRAL IMAGES

(71) Applicant: Intel Corporation, Santa Clara, CA (US)

(72) Inventor: Aaron R. Kunze, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 144 days.

(21) Appl. No.: 13/631,277

(22) Filed: Sep. 28, 2012

(65) Prior Publication Data

US 2014/0093178 A1    Apr. 3, 2014

(51) Int. Cl.
*G06K 9/36* (2006.01)
*G06K 9/54* (2006.01)
*G06K 9/46* (2006.01)

(52) U.S. Cl.
USPC ............................ 382/276; 382/305; 382/190

(58) Field of Classification Search
None
See application file for complete search history.

(56) References Cited

U.S. PATENT DOCUMENTS

| 2009/0303342 A1* | 12/2009 | Corcoran et al. | 348/222.1 |
| 2010/0111446 A1* | 5/2010 | Lim et al. | 382/305 |
| 2011/0211233 A1* | 9/2011 | Yokono | 358/474 |

* cited by examiner

*Primary Examiner* — Bhavesh Mehta
*Assistant Examiner* — David F Dunphy
(74) *Attorney, Agent, or Firm* — Jordan IP Law, LLC

(57) ABSTRACT

Methods and apparatuses to reduce memory bandwidth consumption when executing a program that uses integral images are provided. A first integral image representation of a grayscale image may be computed using a first number of bits per pixel. A second integral image representation of the grayscale image may be computed using a second number of bits per pixel. Additionally, an image processing algorithm may be executed on the grayscale image, wherein the size of a rectangle to be used by the image processing algorithm can be determined. Based on the size of the rectangle to be used by the image processing algorithm, it may be determined whether to use the first integral image representation or second integral image representation for the image processing algorithm.

22 Claims, 6 Drawing Sheets

REDUCING MEMORY BANDWIDTH CONSUMPTION WHEN EXECUTING A PROGRAM THAT USES INTEGRAL IMAGES

BACKGROUND

An integral image representation of a grayscale image can be used in place of the grayscale image to efficiently perform image processing on the grayscale image. Although processing the integral image of a grayscale image can reduce memory bandwidth consumption of image processing algorithms to a certain extent, system constraints may call for further reduction of memory bandwidth.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Various implementations of this disclosure provide apparatuses and methods for reducing memory bandwidth consumption when executing a program that uses integral images.

Figure 1:
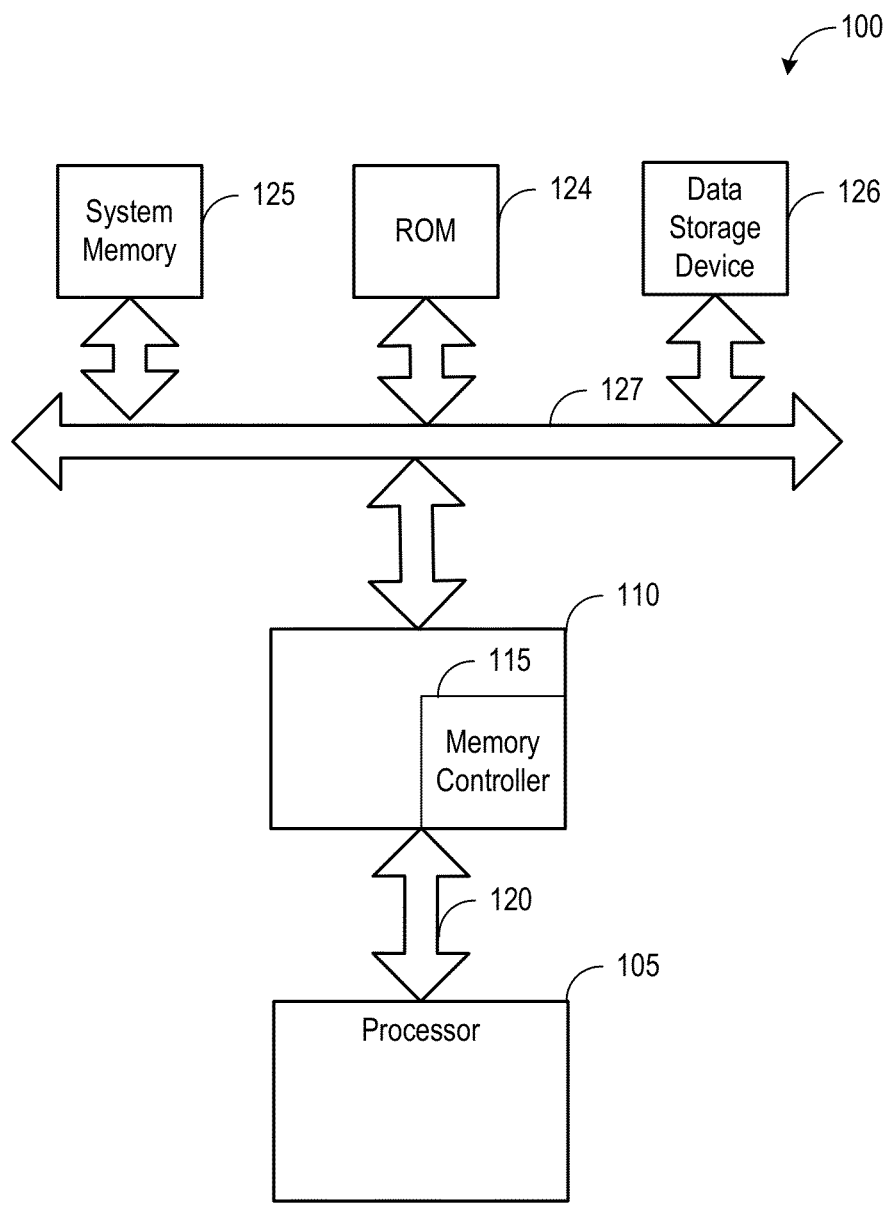
FIG. 1 is a block diagram illustrating an example computer system operable to reduce the memory bandwidth consumption when executing a program that uses integral images.

FIG. 1 illustrates an example computer system 100 operable to reduce the memory bandwidth consumption when executing a program that uses integral images. The system 100 can include a processor 105 coupled to a bus controller 110 via a CPU bus 120. The bus controller 110 can include a memory controller 115. In some implementations, the memory controller 115 can be external to the bus controller 110. The memory controller 115 can interface the processor 105 to a system memory 125 via a memory bus 127. In some implementations, the system memory 125 can be described as a "main memory" of the system 100.

In some implementations, the system memory 125 can store information and instructions to be executed by processor 105. The system memory 125 may store data (e.g., integral image data) that is to be accessed by the processor to implement, for example, code to execute image and video processing applications that use integral images. The system memory 125 may include dynamic random access memory (DRAM) modules that are accessed by the memory controller 115.

The computer system 100 may also include a read only memory (ROM) 124 (and/or other static storage device) coupled to the memory bus 127 to store static information and instructions for the processor 105. A data storage device 126 (e.g., a magnetic disk, optical disk, and/or other machine readable media) may also be coupled to memory bus 127 to store information and instructions for processor 105. For example, the data storage device 126 can include code to execute image and video processing applications (e.g., computer vision, face detection, or feature detection modules and/or algorithms) that use integral images.

Figure 2A:
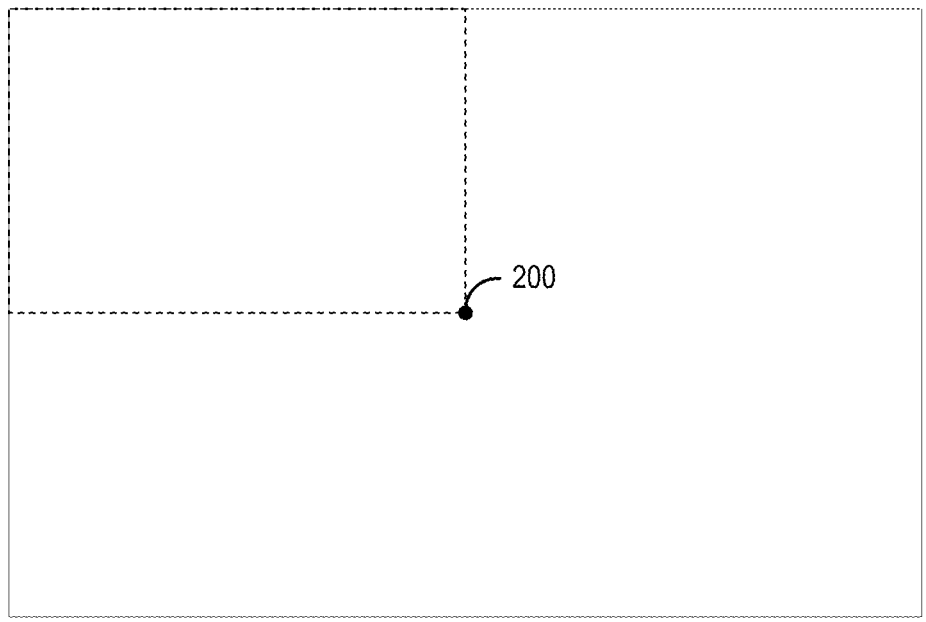
FIG. 2A illustrates the integral image representation of a grayscale image.
Figure 2B:
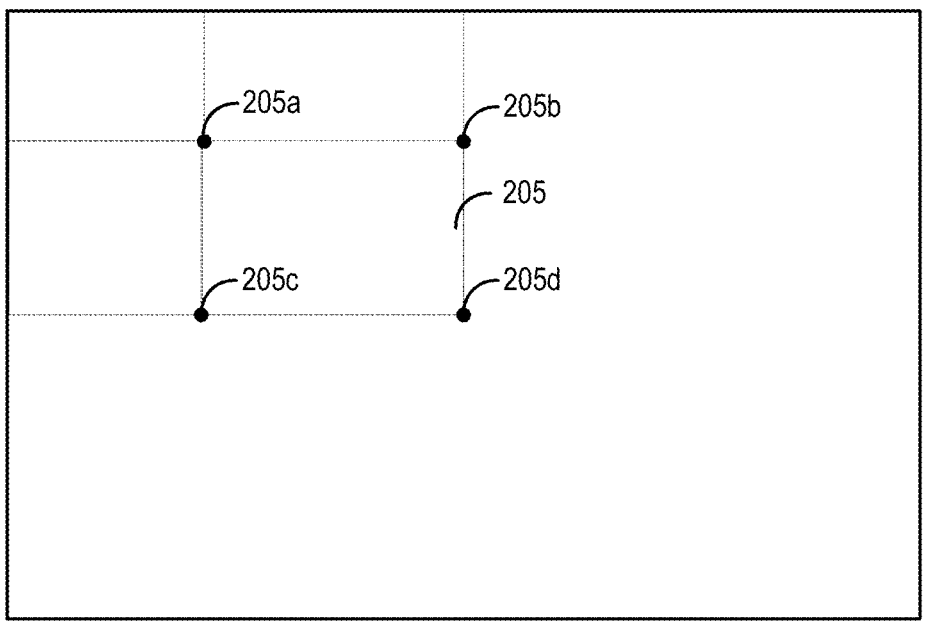
FIG. 2B illustrates how the integral image representation can be used to calculate the sum of pixel values of the original grayscale image in a rectangular area.

As shown in FIG. 2A, the integral image representation of a grayscale image at pixel (x,y) 200 can be the sum of the pixel values of the original grayscale image above and to the left of pixel (x,y). Thus, referring to FIG. 2B, the integral image representation can be used to calculate the sum of the pixel values of the original grayscale image in a rectangular area 205 using the integral image values at the corners 205a-d of the rectangle 205. More specifically, the sum of the pixel values of the original grayscale image in the rectangle 205 may equal the integral image representation of the grayscale image at pixel 205d minus the integral image representation of the grayscale image at pixel 205b minus the integral image representation of the grayscale image at pixel 205c plus the integral image representation of the grayscale image at pixel 205a.

In existing systems, the number of bits used for each pixel in the integral image representation of the original grayscale image is based on the size of the largest rectangle to be used by the image processing algorithm and the number of bits used for each pixel in the original grayscale image. For example, if the number of bits used for each pixel in the original grayscale image is 8-bits and the largest rectangle to be used by an image processing algorithm is 512×512, the number of bits used for each pixel in the integral image representation of the original grayscale image is at least 26 bits to represent the largest sum of the pixel values of the original grayscale image to be calculated by the image processing algorithm.

Figure 3:
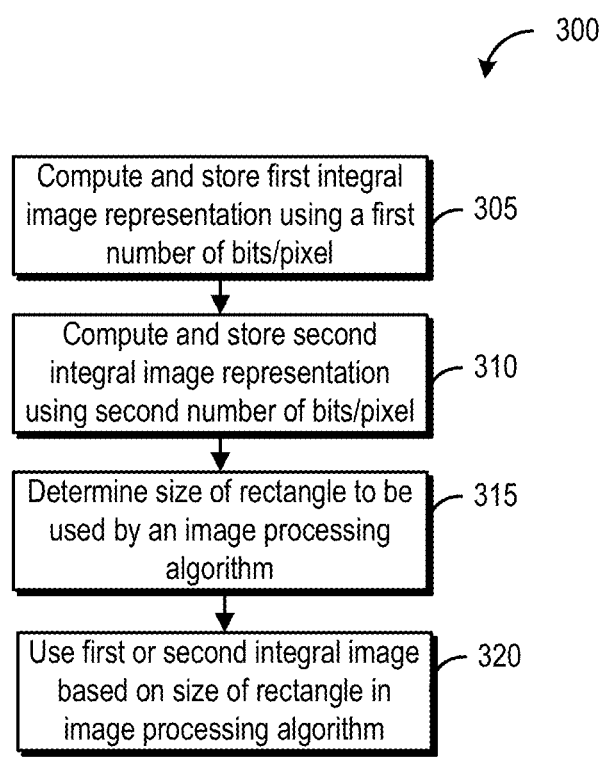
FIG. 3 is a flowchart of an example of a method of reducing the memory bandwidth consumption when executing a program that uses integral images according to an embodiment.

FIG. 3 illustrates a process 300 to reduce the memory bandwidth consumption when executing a program that uses integral images. At stage 305, a first integral image representation of a grayscale image is computed and stored using a first number of bits per pixel. In some implementations, the first number of bits per pixel may be sufficient to represent the largest sum possible of the pixels in the grayscale image in a rectangle that is smaller than the largest rectangle to be used by the image processing algorithm.

Stage 310 may provide for computing and storing a second integral image representation of a grayscale image using a second number of bits per pixel. In some implementations, the second number of bits per pixel may be greater than the first number of bits per pixel. In some implementations, the second number of bits per pixel may be sufficient to represent the largest sum possible of the pixels in the grayscale image in the largest rectangle to be used by the image processing algorithm.

At stage 315, it is determined the size of a rectangle to be used by an image processing algorithm. At stage 320, based on the size of the rectangle to be used by the image processing algorithm, either the first integral image representation or the second integral image representation of the grayscale image is used by the image processing algorithm. Stages 315-320 may be repeated for each rectangle processed by the image processing algorithm. Of particular note is that by using fewer bits to represent the integral image representation for smaller rectangles processed by the image processing algorithm, the memory bandwidth consumption can be reduced.

Figure 4:
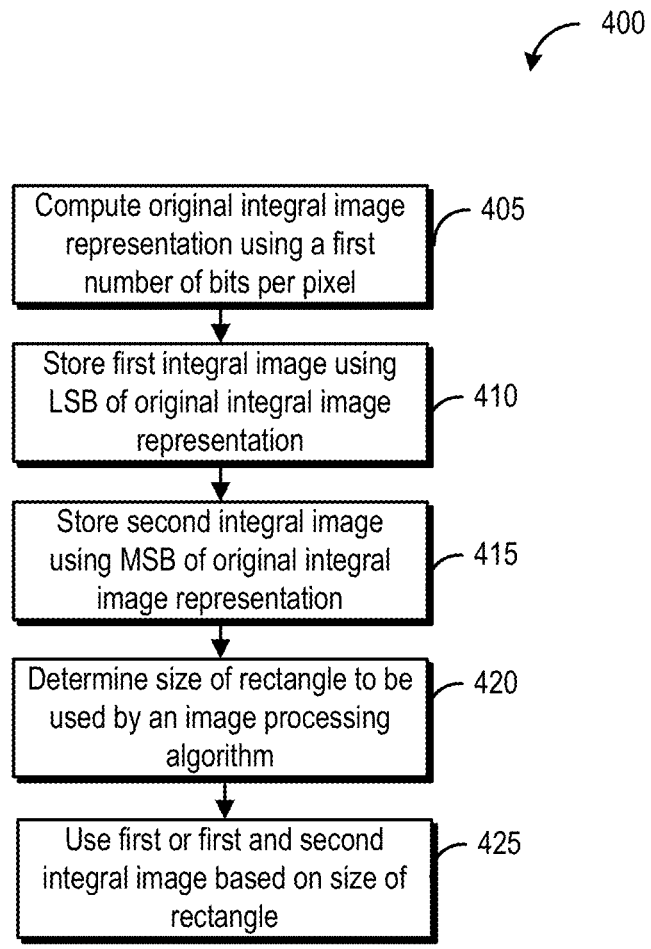
FIG. 4 is a flowchart of an example of a method of reducing the memory bandwidth consumption when executing a program that uses integral images according to another embodiment.

FIG. 4 illustrates another process 400 to reduce the memory bandwidth consumption when executing a program that uses integral images. At stage 405, an original integral image representation of a grayscale image is computed using a first number of bits per pixel. In some implementations, the first number of bits per pixel may be sufficient to represent the largest sum possible of the pixels in the grayscale image in the largest rectangle to be used by the image processing algorithm.

A first integral image representation of the grayscale image may be stored at block 410 using a number of the least significant bits of the original integral image representation. The number of the least significant bits may be sufficient to represent the largest sum possible of the pixels in the grayscale image in a rectangle that is smaller than the largest rectangle to be used by the image processing algorithm.

At stage 415, a second integral image representation of the grayscale image is stored using a number of the most significant bits of the first integral image representation. In some implementations, the number of the most significant bits of the first integral image are the remaining bits of the first integral image representation that were not used at stage 410.

At stage 420, it is determined the size of a rectangle to be used by an image processing algorithm. Based on the size of the rectangle to be used by the image processing algorithm, either the first integral image representation or both the first integral image representation and the second integral image representation of the grayscale image is used by the image processing algorithm at illustrated stage 425. Stages 42-425 may be repeated for each pixel location processed by the image processing algorithm.

Computing devices contemplated to be within the scope of this disclosure include personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Figure 5:
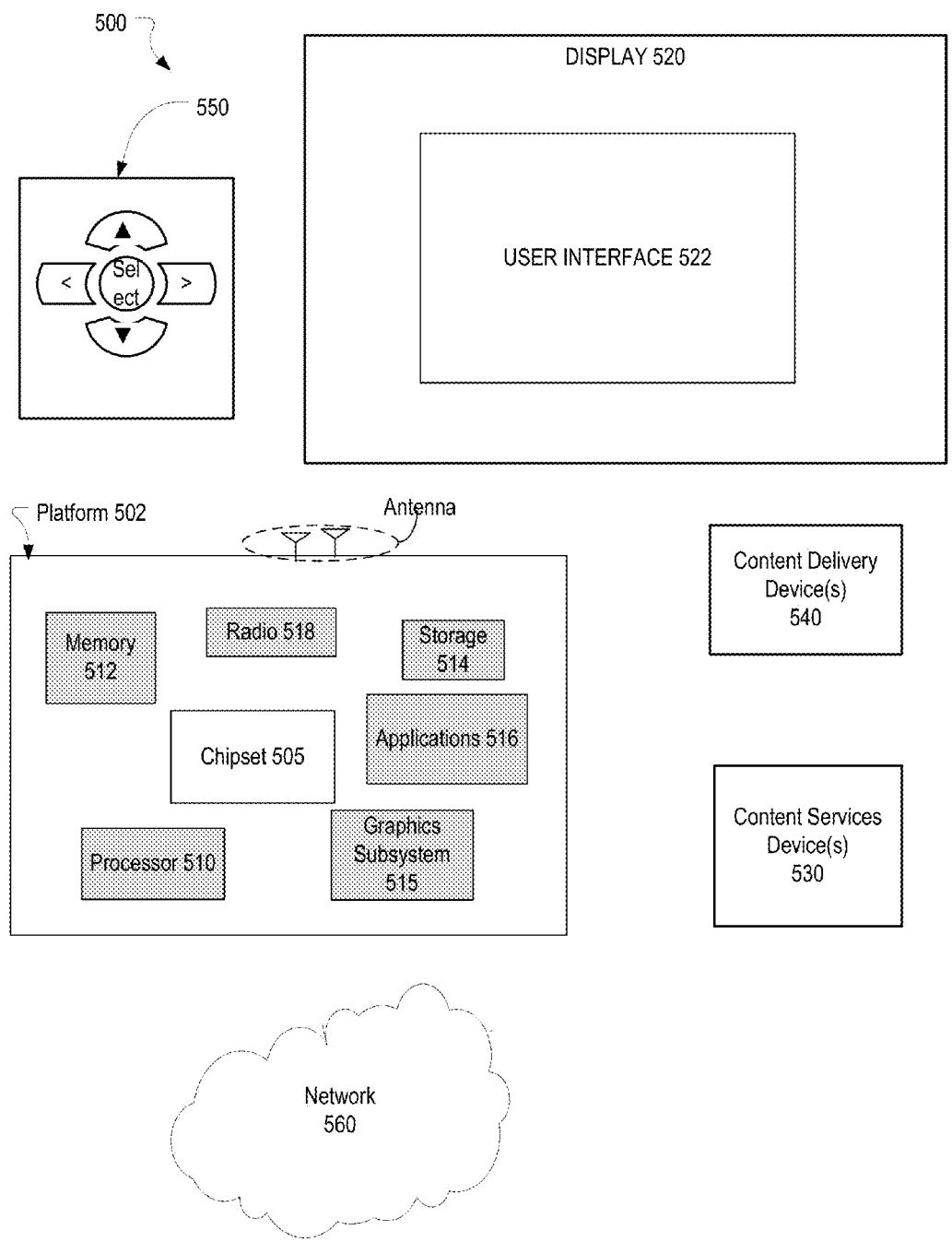
FIG. 5 is a block diagram illustrating an example system of this disclosure.

FIG. 5 illustrates an example embodiment of a system 500 of this disclosure comprising a platform 502, a display 520, content services device(s) 530, content delivery device(s) 540, and navigation controller 550. In embodiments, system 500 may be a media system although system 500 is not limited to this context. For example, components of system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 500 comprises a platform 502 coupled to a display 520. Platform 502 may receive content from a content device such as content services device(s) 530 or content delivery device(s) 540 or other similar content sources. A navigation controller 550 comprising one or more navigation features may be used to interact with, for example, platform 502 and/or display 520. Each of these components is described in more detail below.

In embodiments, platform 502 may comprise any combination of a chipset 505, processor 510, memory 512, storage 514, graphics subsystem 515, applications 516 and/or radio 518. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor 510 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 510 may comprise dual-core processor(s), dual-core mobile processor(s), and so forth.

Memory 512 may be implemented as a volatile memory device such as, but not limited to, a Random Access Memory (RAM), Dynamic Random Access Memory (DRAM), or Static RAM (SRAM).

Storage 514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 514 may comprise technology to increase the storage performance enhanced protection for valuable digital media when multiple hard drives are included, for example.

Graphics subsystem 515 may perform processing of images such as still images or video for display. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, DisplayPort, wireless HDMI, and/or wireless HD compliant techniques. In embodiments, graphics subsystem 515 could be integrated into processor 510 or chipset 505. In embodiments, graphics subsystem 515 could be a stand-alone card communicatively coupled to chipset 505.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 518 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In embodiments, display 520 may comprise any television type monitor or display. Display 520 may comprise, for example, a computer display screen, touch screen display, video monitor, television-like device, and/or a television. Display 520 may be digital and/or analog. In embodiments, display 520 may be a holographic display. Also, display 520 may be a transparent surface that may receive a visual projection. Such projections may convey various forms of information, images, and/or objects. For example, such projections may be a visual overlay for a mobile augmented reality (MAR) application. Under the control of one or more software applications 516, platform 502 may display user interface 522 on display 520.

In embodiments, content services device(s) 530 may be hosted by any national, international and/or independent service and thus accessible to platform 502 via the Internet, for example. Content services device(s) 530 may be coupled to platform 502 and/or to display 520. Platform 502 and/or content services device(s) 530 may be coupled to a network 560 to communicate (e.g., send and/or receive) media information to and from network 560. Content delivery device(s) 540 also may be coupled to platform 502 and/or to display 520.

In embodiments, content services device(s) 530 may comprise a cable television box, personal computer, network, telephone, Internet enabled devices or appliance capable of delivering digital information and/or content, and any other similar device capable of unidirectionally or bidirectionally communicating content between content providers and platform 502 and/display 520 directly or via network 560. It will be appreciated that the content may be communicated unidirectionally and/or bidirectionally to and from any one of the components in system 500 and a content provider via network 560. Examples of content may include any media information including, for example, video, music, medical and gaming information, and so forth.

Content services device(s) 530 receives content such as cable television programming including media information, digital information, and/or other content. Examples of content providers may include any cable or satellite television or radio or Internet content providers. The provided examples are not meant to limit embodiments of the invention.

In embodiments, platform 502 may receive control signals from navigation controller 550 having one or more navigation features. The navigation features of controller 550 may be used to interact with user interface 522, for example. In embodiments, navigation controller 550 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 may be echoed on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In embodiments, controller 550 may not be a separate component but integrated into platform 502 and/or display 520. Embodiments, however, are not limited to the elements or in the context shown or described herein.

In embodiments, drivers (not shown) may comprise technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 when the platform is turned "off". In addition, chip set 505 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 500 may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the invention.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

As described above, system 500 may be embodied in varying physical styles or form factors. FIG. 5 illustrates embodiments of a small form factor device 500 in which components of system 500 may be embodied. In embodiments, for example, device 500 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 6:
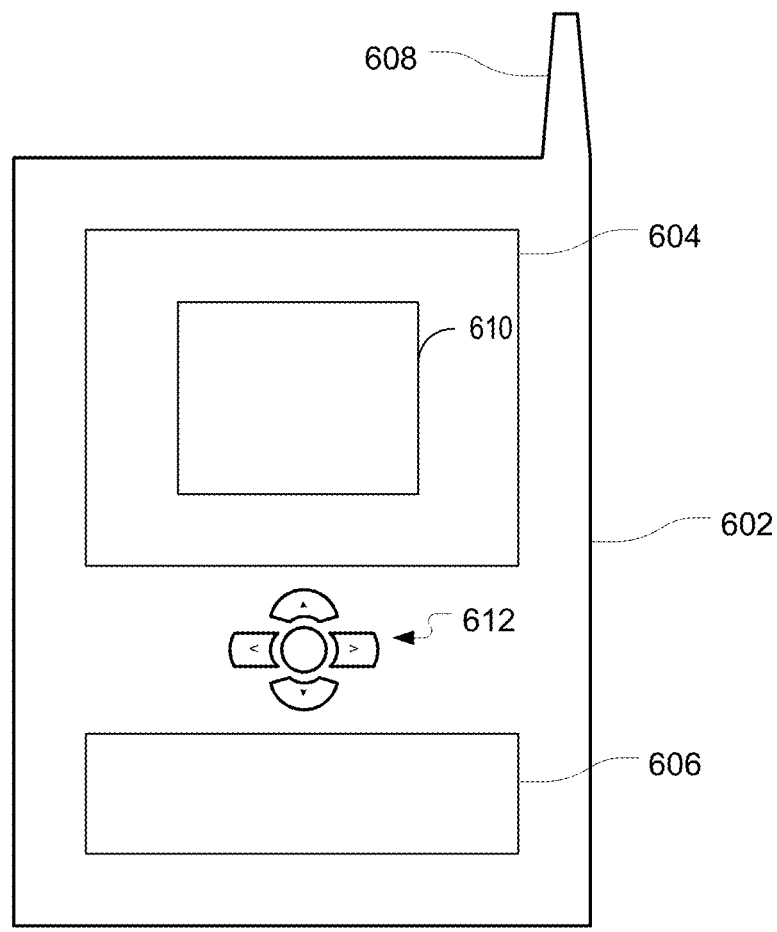
FIG. 6 is a block diagram illustrating an example small form factor device in which components of the system of FIG. 5 may be embodied.

As shown in FIG. 6, device 600 may comprise a housing 602, a display 604, an input/output (I/O) device 606, and an antenna 608. Device 600 also may comprise navigation features 612. Display 604 may comprise any suitable display unit for displaying information appropriate for a mobile computing device. I/O device 606 may comprise any suitable I/O device for entering information into a mobile computing device. Examples for I/O device 606 may include an alphanumeric keyboard, a numeric keypad, a touch pad, input keys, buttons, switches, rocker switches, microphones, speakers, voice recognition device and software, and so forth. Information also may be entered into device 600 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments may therefore include a system including a storage device to store a program that includes an image processing application, storage to store a first integral image representation of a grayscale image using a first number of bits per pixel and a second integral image representation of the grayscale image using a second number of bits per pixel, and a processor to execute the image processing application using the first integral image representation and the second integral image representation.

Embodiments also may include a method including computing and storing a first integral image representation of a grayscale image using a first number of bits per pixel, computing and storing a second integral image representation of the grayscale image using a second number of bits per pixel, executing an image processing algorithm on the grayscale image, determining the size of a rectangle to be used by the image processing algorithm, and determining whether to use the first integral image representation or second integral image representation for the image processing algorithm based on the size of the rectangle to be used by the image processing algorithm.

Embodiments also may include a method including computing an original integral image representation of a grayscale image using a first number of bits per pixel, computing and storing a first integral image representation of the grayscale image using a number of the least significant bits of the original integral image representation, computing and storing a second integral image representation of the grayscale image using a number of the most significant bits of the original integral image representation, executing an image processing algorithm on the grayscale image, determining the size of a rectangle to be used by the image processing algorithm, and determining whether to use the first integral image representation or both the first integral image representation and the second integral image representation for the image processing algorithm based on the size of the rectangle to be used by the image processing algorithm.

Embodiments also may include a computer readable medium including a set of instructions which, if executed by a processor, cause a computer to compute and store a first integral image representation of a grayscale image, compute and store a second integral image representation of the grayscale image, execute an image processing algorithm on the grayscale image, determine a size of a rectangle to be used by the image processing algorithm, and determine whether to use the first integral image representation or second integral image representation for the image processing algorithm based on the size of the rectangle to be used by the image processing algorithm.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections.

In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A method comprising:
   computing and storing a first integral image representation of a grayscale image using a first number of bits per pixel;
   computing and storing a second integral image representation of the grayscale image using a second number of bits per pixel;
   executing an image processing algorithm on the grayscale image;
   determining the size of a window to be used by the image processing algorithm; and
   determining whether to use the first integral image representation or second integral image representation for the image processing algorithm based on the size of the window to be used by the image processing algorithm.

2. The method of claim 1, wherein the first number of bits per pixel are sufficient to represent a largest sum possible of the pixels in the grayscale image in a window that is smaller than a largest window to be used by the image processing algorithm.

3. The method of claim 2, wherein the second number of bits per pixel are sufficient to represent the largest sum possible of the pixels in the grayscale image in the largest window to be used by the image processing algorithm.

4. The method of claim 1, wherein the second number of bits per pixel is greater than the first number of bits per pixel.

5. A system comprising:
   a storage device to store a program that includes an image processing application;
   storage to store a first integral image representation of a grayscale image using a first number of bits per pixel and a second integral image representation of the grayscale image using a second number of bits per pixel; and
   a processor to execute the image processing application using the first integral image representation and the second integral image representation, determine a size of a window to be used by the image processing algorithm and determine whether to use the first integral image representation or the second integral image representation for the image processing algorithm based on the size of the window to be used by the image processing algorithm.

6. The system of claim 5, wherein the first number of bits per pixel are to be sufficient to represent a largest sum possible of pixels in the grayscale image in a window that is smaller than a largest window to be used by the image processing algorithm.

7. The system of claim 6, wherein the second number of bits per pixel are to be sufficient to represent the largest sum possible of the pixels in the grayscale image in the largest window to be used by the image processing algorithm.

8. The system of claim 5, wherein the second number of bits per pixel is to be greater than the first number of bits per pixel.

9. The system of claim 5, wherein the image processing application includes a feature detection module.

10. The system of claim 5, wherein the image processing application includes a face detection module.

11. A method comprising:
computing an original integral image representation of a grayscale image using a first number of bits per pixel;
computing and storing a first integral image representation of the grayscale image using a number of the least significant bits of the original integral image representation;
computing and storing a second integral image representation of the grayscale image using a number of the most significant bits of the original integral image representation;
executing an image processing algorithm on the grayscale image;
determining the size of a window to be used by the image processing algorithm; and
determining whether to use the first integral image representation or both the first integral image representation and the second integral image representation for the image processing algorithm based on the size of the window to be used by the image processing algorithm.

12. The method of claim 11, wherein the first number of bits per pixel are sufficient to represent a largest sum possible of pixels in the grayscale image in a largest window to be used by the image processing algorithm.

13. The method of claim 11, wherein the number of the least significant bits are sufficient to represent the largest sum possible of the pixels in the grayscale image in a window that is smaller than the largest window to be used by the image processing algorithm.

14. The method of claim 13, wherein the number of the most significant bits of the original integral image are the remaining bits of the original integral image representation that are not part of the least significant bits.

15. A non-transitory computer readable medium comprising a set of instructions which, if executed by a processor, cause a computer to:
compute and store a first integral image representation of a grayscale image;
compute and store a second integral image representation of the grayscale;
execute an image processing algorithm on the grayscale image;
determine a size of a window to be used by the image processing algorithm; and
determine whether to use the first integral image representation or second integral image representation for the image processing algorithm based on the size of the window to be used by the image processing algorithm.

16. The computer readable medium of claim 15, wherein the first integral image representation of the grayscale image comprise a first number of bits per pixel.

17. The computer readable medium of claim 16, wherein the second integral image representation of the grayscale image comprise a second number of bits per pixel.

18. The computer readable medium of claim 17, wherein the first number of bits per pixel are sufficient to represent a largest sum possible of pixels in the grayscale image in a window that is smaller than a largest window to be used by the image processing algorithm.

19. The computer readable medium of claim 18, wherein the second number of bits per pixel are sufficient to represent the largest sum possible of the pixels in the grayscale image in the largest window to be used by the image processing algorithm.

20. The computer readable medium of claim 17, wherein the second number of bits per pixel is greater than the first number of bits per pixel.

21. The computer readable medium of claim 15, wherein the image processing application is to include a feature detection module.

22. The computer readable medium of claim 15, wherein the image processing application is to include a face detection module.

* * * * *